United States Patent [19]

Hamajima

[11] Patent Number: 5,208,498

[45] Date of Patent: May 4, 1993

[54] LINEAR ACTUATOR

[75] Inventor: Takanori Hamajima, Chita, Japan

[73] Assignee: Aisien Seiki Kabushiki Kaisha, Kariya, Japan

[21] Appl. No.: 766,381

[22] Filed: Sep. 27, 1991

[30] Foreign Application Priority Data

Sep. 28, 1990 [JP] Japan .................................. 2-256858
Sep. 20, 1991 [JP] Japan .................................. 3-241664

[51] Int. Cl.⁵ .......................................... H02K 41/00
[52] U.S. Cl. ..................................... 310/12; 310/22; 310/24; 310/156
[58] Field of Search ..................... 310/12, 13, 14, 15, 310/17, 22, 23, 24, 27, 30, 34, 35, 156

[56] References Cited

U.S. PATENT DOCUMENTS

| 4,349,757 | 9/1982 | Bhate | 310/15 |
| 4,785,210 | 11/1988 | Maruyama | 310/12 |
| 4,810,914 | 3/1989 | Karidis | 310/12 |
| 4,924,123 | 5/1990 | Hamajima | 310/15 |

FOREIGN PATENT DOCUMENTS 0073570 4/1986 Japan .................................. 310/15

Primary Examiner—R. Skudy
Attorney, Agent, or Firm—Burns, Doane, Swecker & Mathis

[57] ABSTRACT

A linear actuator comprises a shaft made of non-magnetic material for being reciprocatingly moved in an axial direction of the shaft, a plurality of ring-shaped moving cores which are located on the shaft and arranged in the axial direction thereof, and each of which is made of magnetic material, a first spacer made of non-magnetic material and interposed between two adjacent moving cores, a plurality of ring-shaped permanent magnets each of which is disposed on one of the respective ring-shaped moving cores and each of which includes a plurality of magnets arranged in the circumferential direction in such a manner that adjacent magnets are different in polarity, and a stationary core located around each of the permanent magnets with a clearance. The stationary core is formed with an outer ring portion formed, magnetic poles which face the permanent magnets, and legs which connect the outer ring portion and the magnetic poles. Coils are wound around the legs. The moving cores and the stationary core are formed of a plurality of thin plates laminated to one another and made of magnetic material. The number of stationary cores in the axial direction of the shaft is smaller than the number of permanent magnets by one, and the polarity of the permanent magnets are formed in the radial direction of the shaft.

19 Claims, 7 Drawing Sheets

LINEAR ACTUATOR

BACKGROUND OF THE INVENTION

1. Field of the Invention

The present invention relates to a linear actuator and more particularly to a linear actuator used for a generator, for example.

2. Description of the Related Art

A conventional linear actuator 80, as shown in FIG. 7, is disclosed in U.S. Pat. No. 4,349,757. A shaft 81 which is made of magnetic material is brought into reciprocation in a fixed stroke by a driving source (not shown). A plurality of permanent magnets 82 are located around the shaft 81 in the axial direction thereof. The polarities of the permanent magnets 82 are formed in the radial direction. A cylindrical stationary core 83 is located around the permanent magnets 82.

A plurality of sector configured members 84 which are made of magnetic material form the stationary core 83. The sector configured members 84 have slots 85. Each of the magnetic poles 86 which face the permanent magnets 82 is interposed between two adjacent slots 85. Coils 87 are wound around the magnetic poles 86.

In the above-mentioned linear actuator, it is very difficult to construct the device such that the cylindrical stationary core 83 is formed by an aggregate of the sector configured members 84 and the coils 87 are wound around the magnetic poles 86 which are located in the inner circumference portion of the cylindric stationary core 83.

SUMMARY OF THE INVENTION

Accordingly, it is a primary object of the present invention to provide an easy forming method of the stationary and moving cores and winding method of the coil.

The above and other objects are achieved according to the present invention by a linear actuator which comprises a shaft made of non-magnetic material for being reciprocatingly moved, a plurality of ring-shaped moving cores which are located on the shaft and arranged in the axial direction thereof, and each of which is made of magnetic material, a first spacer made of non-magnetic material and interposed between two adjacent moving cores, a plurality of ring-shaped permanent magnets each of which is on the respective ring-shaped moving core and each of which includes a plurality of magnets arranged in the circumferential direction in such a manner that adjacent magnets are different in polarity, a stationary core located around each of the permanent magnets with a clearance, an outer ring portion formed in the stationary core, magnetic poles formed in the stationary core and facing the permanent magnets, legs formed in the stationary core and connecting the outer ring portion and the magnetic poles, and coils wound around the legs, wherein plural thin plates made of magnetic material are laminated and form the moving cores and the stationary core, the number of stationary cores in the axial direction of the shaft is smaller than the number of permanent magnets by one, and the polarities of the permanent magnets are formed in the radial direction of the shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures, wherein.

DETAILED DESCRIPTION OF THE INVENTION

Figure 1:
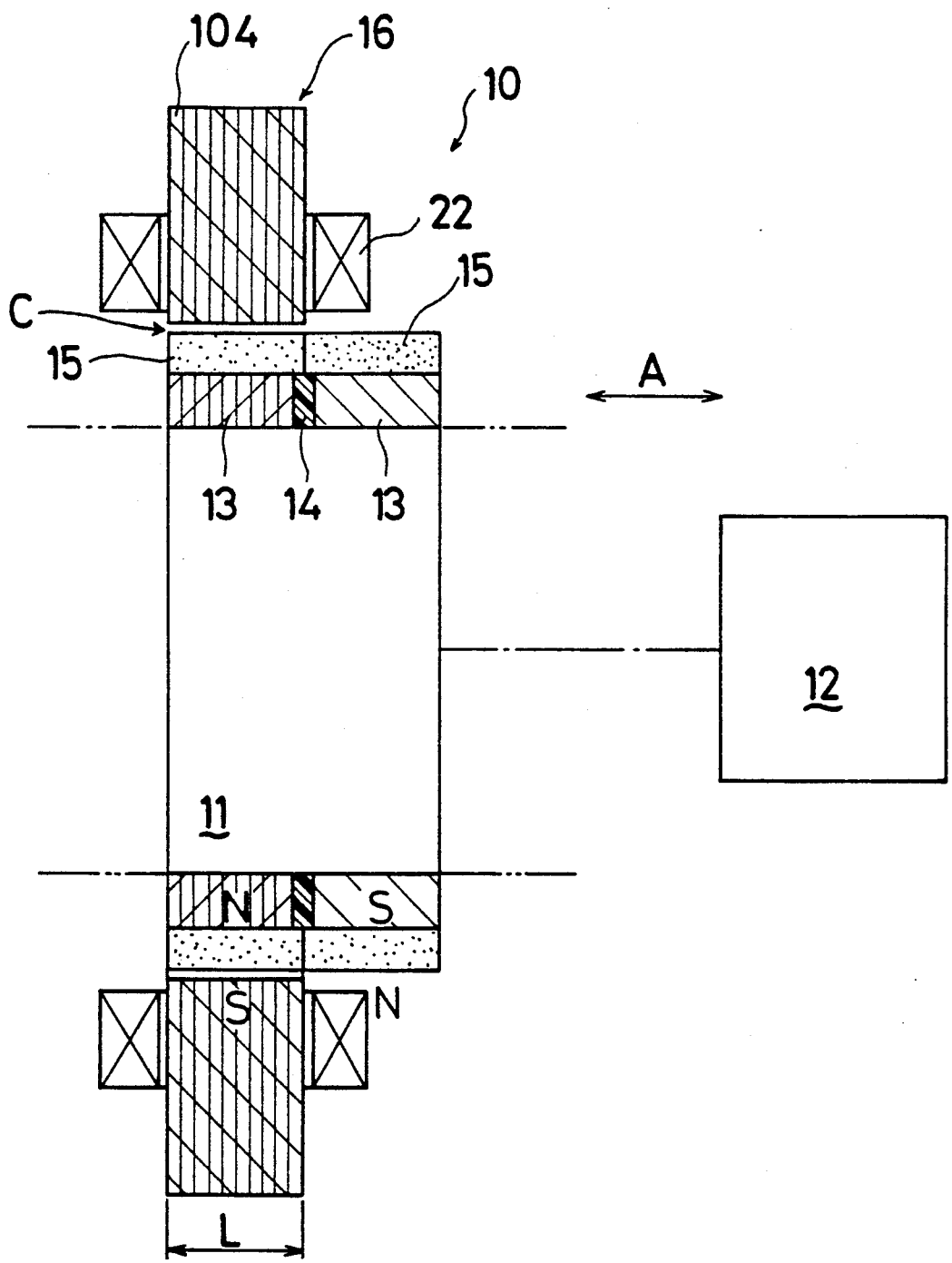
FIG. 1 is a cross-sectional view of a linear actuator according to the first embodiment of the invention.
Figure 2:
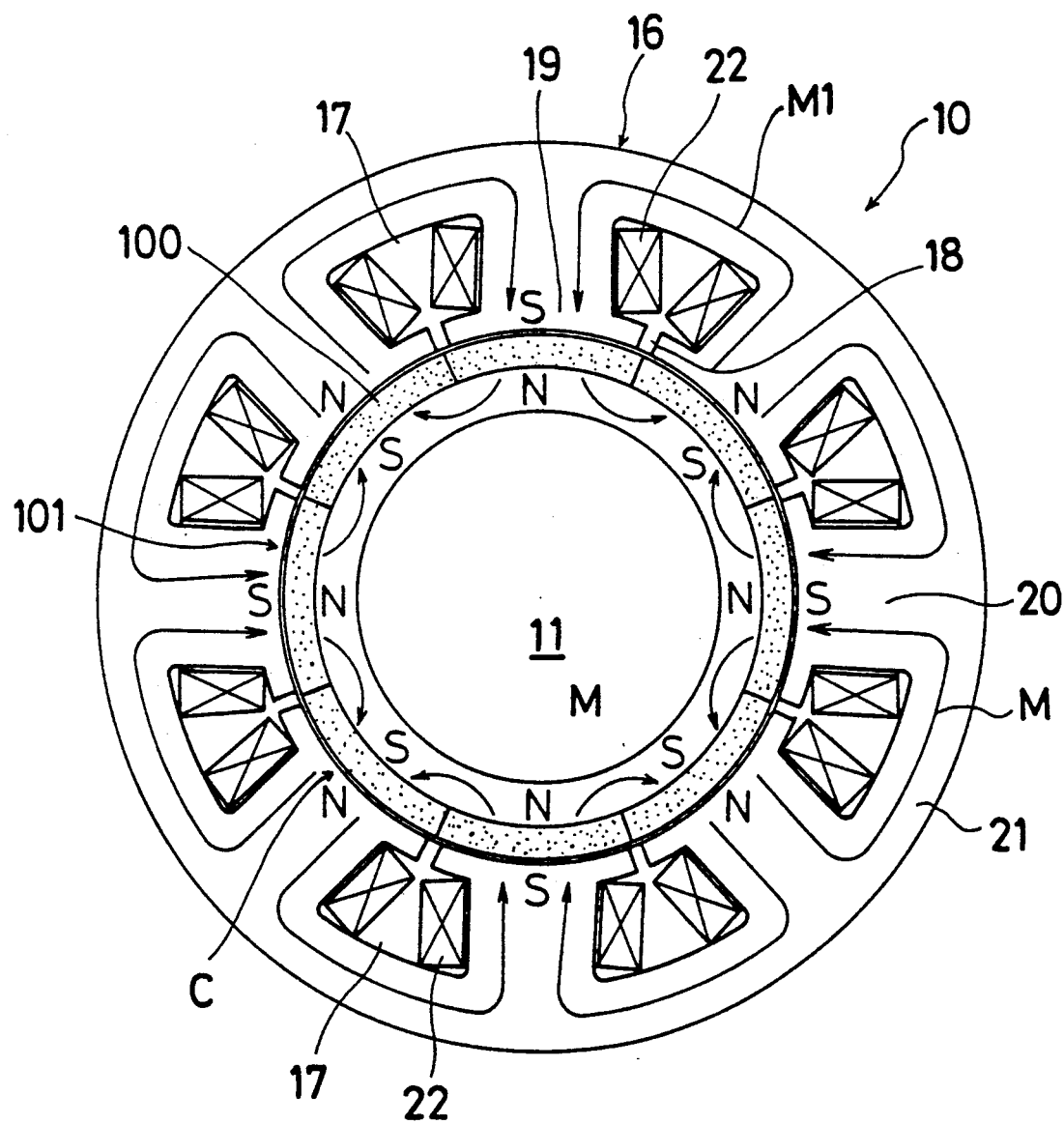
FIG. 2 is an elevational view of FIG. 1.

Reference is initially made to FIGS. 1 and 2 wherein a linear actuator 10 is shown. Here, a shaft 11 which is made of non-magnetic material is brought into reciprocation in a fixed stroke A by a driving source 12 such as a Stirling engine. Two ring-shaped moving core 13 which are made of magnetic material are located around the shaft 11 in the axial direction thereof. A spacer 14 which is made of non-magnetic material is interposed between two adjacent ring-shaped moving cores 13. For example, the thickness of the spacer 14 is about 10% of the thickness of the ring-shaped moving core 13. Plural ring-shaped permanent magnets 15 concerning one moving core 13 are located therearound. The ring-shaped permanent magnet 15 is formed by an aggregate 101 of the sector configured permanent magnets 100. The polarities of the permanent magnets 15 are formed in the radial direction (They are shown in FIGS. 1, 2). The polarities of the neighboring permanent magnets 15 are different. Further, the number of ring-shaped moving cores 13 is the same as the number of permanent magnets 15 in the axial direction of the shaft 11. The length L of one permanent magnet 15 in the axial direction thereof is the same as the stroke A of the shaft 11.

A ring-shaped stationary core 16 is located around the permanent magnets 15 with a clearance C. The ring-shaped stationary core 16 is formed by the following process. First, holes 17 and slits 18 are punched from a doughnut shaped thin plate 104 which is made of magnetic material such as iron. Then, the plural resultant thin plates are laminated for forming one stationary core 16. It is desirable that the above-mentioned moving cores 13 are also formed in the same way. In FIG. 1, a laminated condition is shown in only one moving core 13 and stationary core 16.

Magnetic pole 19 which faces the permanent magnets 15 is interposed between two adjacent slits 18. Leg 20 connects the magnetic poles 19 and an outer ring portion 21 of the stationary core 16. The magnetic poles 19 and the permanent magnets 15 are identical both of which are on common plural planes in the axial direction of the shaft 11. Coils 22 are wound around the legs 20.

In the above-mentioned linear actuator 10, the shaft 11 is driven by the driving source 12 and the polarity of the permanent magnet 15 facing the magnetic pole 19 is changed from "N" to "S" and vice versa. Thus, a magnetic flux through the coil 22 is changed and an electric current is generated in the coil 22. The magnetic flux is shown as M1 in FIG. 2.

Figure 3:
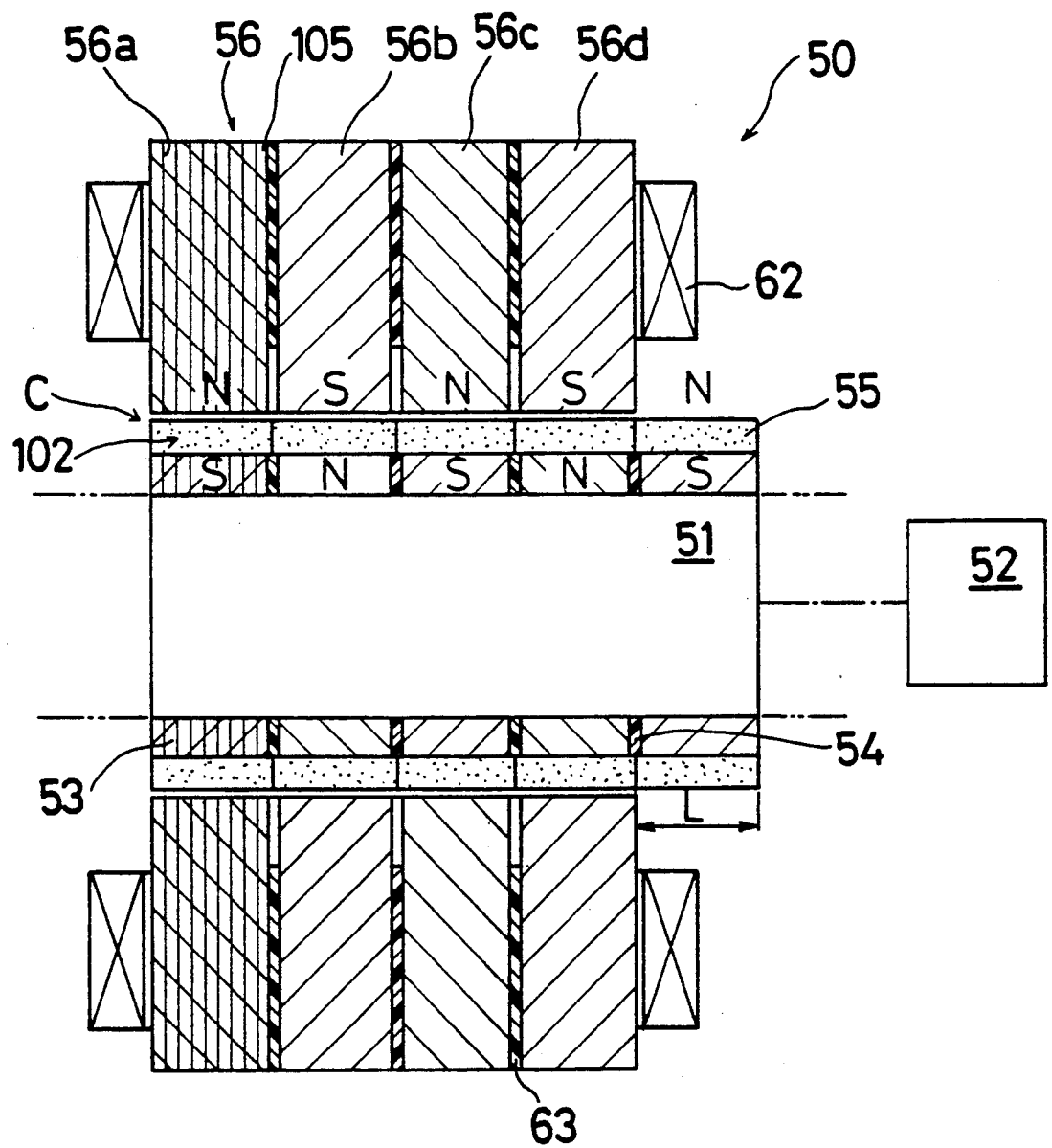
FIG. 3 is a cross-sectional view of a linear actuator according to the second embodiment of the invention.
Figure 4:
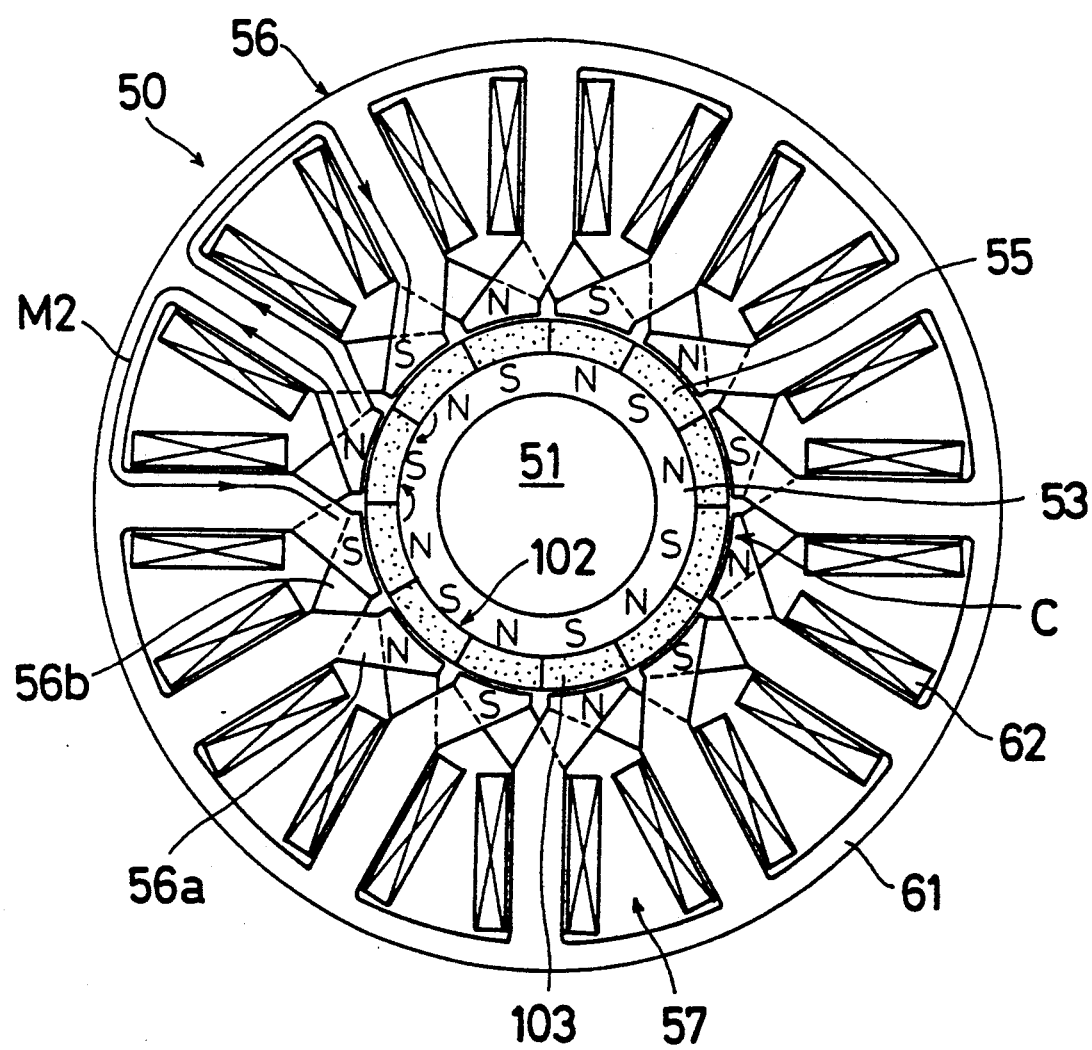
FIG. 4 is an elevational view of FIG. 2.
Figure 5:
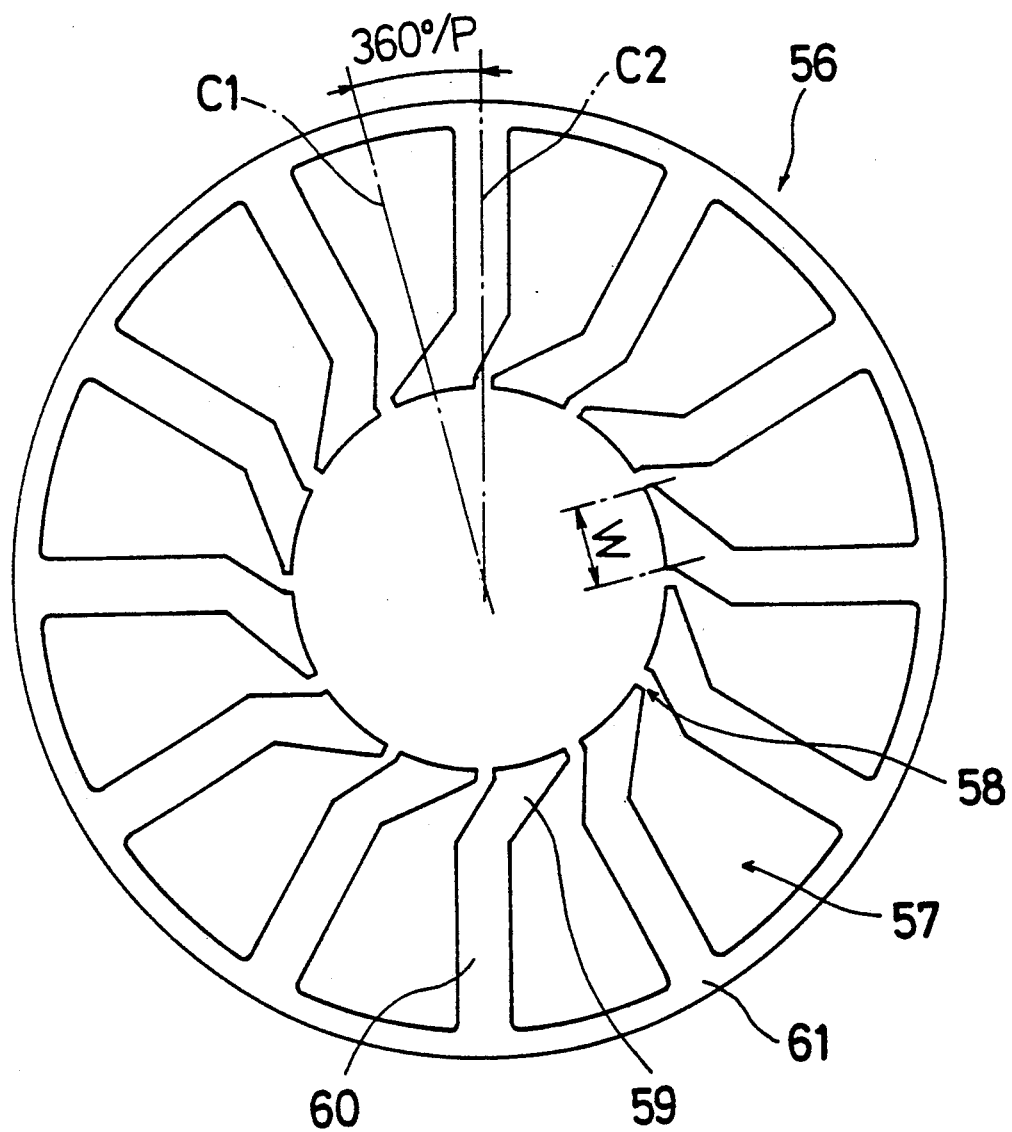
FIG. 5 is an elevational view of a stationary core of FIG. 3.

Next, references made to FIGS. 3, 4 and 5 which shows a linear actuator 50 of a second embodiment according to the present invention.

A shaft 51 which is made of non-magnetic material is brought into reciprocation in a fixed stroke by a driving source 52 such as a Stirling engine. Plural ring-shaped moving cores 53 which are made of magnetic material are located around the shaft 51 in the axial direction thereof. First spacer 54 which is made of non-magnetic material is interposed between two adjacent ring-shaped moving cores 53. For example, a thickness of the first spacer 54 is about 10% of the thickness of the ring-shaped moving core 53. Plural ring-shaped permanent magnets 55 concerning one moving core 53 are located therearound. The polarities of the permanent magnets 55 are formed in the radial direction as seen in FIGS. 3 and 4. The ring-shaped permanent magnets 55 are formed by an aggregate 102 of sector configured permanent magnets 103. The polarities of the neighboring permanent magnets 55 are different. Further, the number of ring-shaped moving cores 53 is the same as the number of permanent magnets 55 in the axial direction of the shaft 51. The length L of one permanent magnet 55 in the axial direction thereof is the same as the stroke of the shaft 51.

Ring-shaped stationary cores 56 are located around the permanent magnets 55 with a clearance C. The number of stationary cores 56 in the axial direction of the shaft 51 is smaller than the number of permanent magnets 55 by one (at least one). It is formed by the following process. First, holes 57 and slits 58 are punched from a doughnut-shaped thin plate 105 which is made of magnetic material such as iron. Then, the plural resultant thin plates are laminated for forming one stationary core 56. It is desirable that the above-mentioned moving cores 53 are also formed in the same way. In FIG. 3, a laminated condition is shown in only one moving core 53 and stationary core 56. Second spacer 63 which is made of non-magnetic material is interposed between two adjacent stationary cores 56. A thickness of the second spacer 63 is the same as a thickness of the first spacer 54.

Magnetic pole 59 which faces the permanent magnet 55 is interposed between two adjacent slits 58. Leg 60 connects the magnetic poles 59 and an outer ring portion 61 of the stationary core 56. A center line C1 of the magnetic pole 59 makes an angle of $(360/P)°$ (P:number of magnetic poles 59 in one stationary core 56) relative to a center line C2 of the leg 60. For example, in this embodiment, the number P of magnetic poles 59 is 12, so the angle is $(360/12=30)°$. Namely, if each of the first and third stationary cores 56a and 56c (or the odd numbered cores) is the same as the stationary core 56 shown in FIG. 5, each of the second and fourth stationary cores 56b and 56d (or the even numbered cores) is in the form of another stationary core which is different from the stationary core 56 with respect to the projecting direction of each magnetic pole 59. That is to say, if the stationary core 56 shown in FIG. 5 represents, for example, the odd numbered cores 56a, 56c, that core turned over through 180° would represent the even numbered cores 56a, 56c, that core turned over through 180° would represent the even numbered cores 56b, 56d. The positions of the magnetic poles 59 of the first and third stationary cores 56a, 56c should coincide with the positions of the magnetic poles 59 of the second and fourth stationary cores 56b, 56d in the radial direction thereof. Thus, there is the above-mentioned deviation between the magnetic pole 59 and the leg 60.

The number of magnetic poles 59 in one stationary core 56 is the same as the number of permanent magnets 55 in one line of the axial direction of the shaft 51. Coils 62 are wound around the legs 60.

In the above-mentioned linear actuator 50, the shaft 51 is driven by the driving source 52 and the polarity of the permanent magnet 55 facing the magnetic pole 59 is changed from "N" to "S" and vice versa. Thus, a magnetic flux through the coil 62 is changed and an electric current is generated in the coil 62. The magnetic flux is shown as M2 in FIG. 4.

Figure 6:
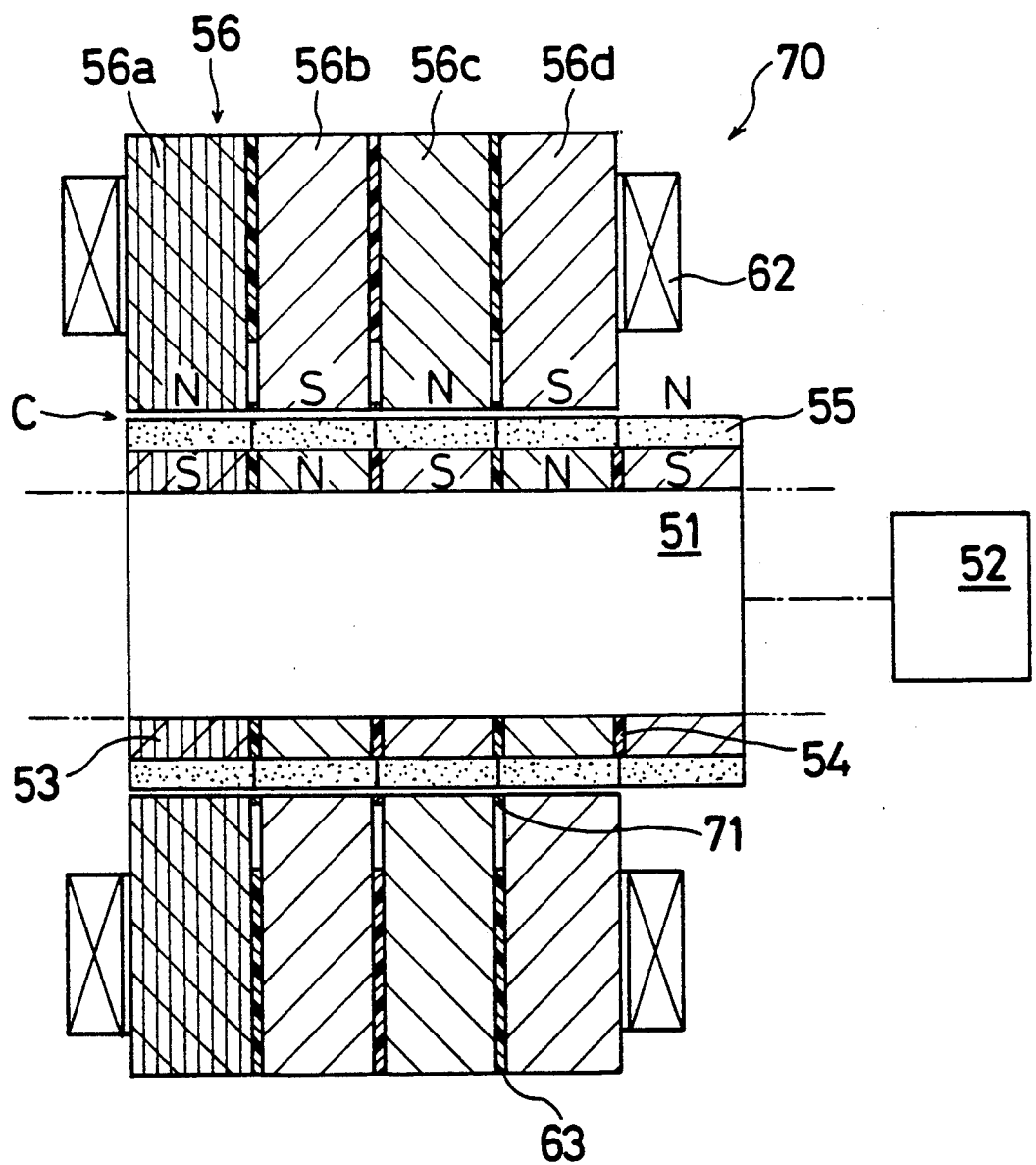
FIG. 6 is an elevational view of a linear actuator according to the third embodiment of the invention.
Figure 7:
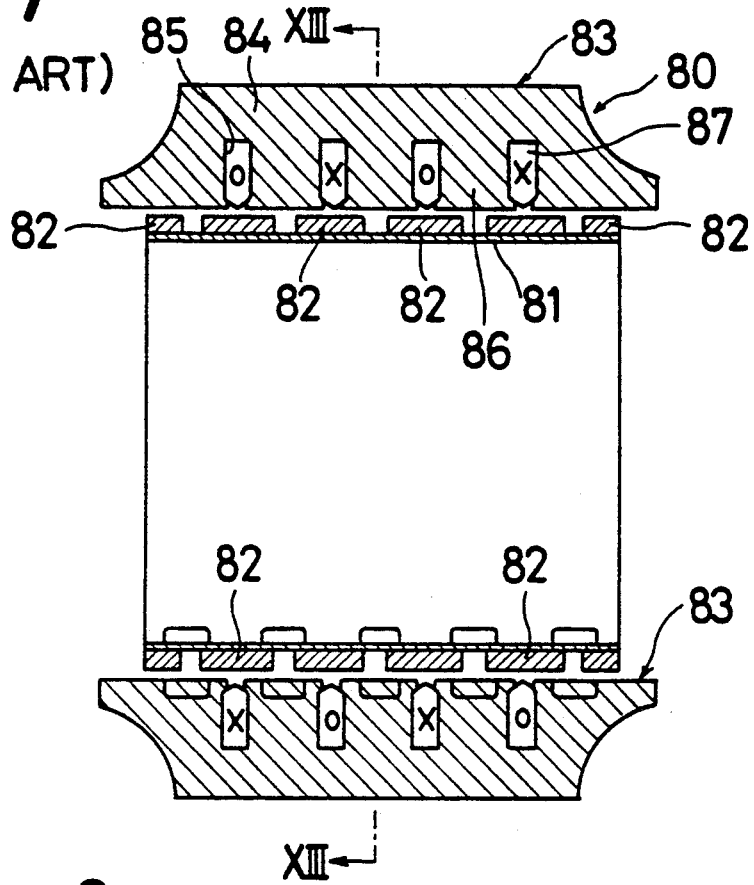
FIG. 7 is a cross-sectional view of a conventional linear actuator.
Figure 8:
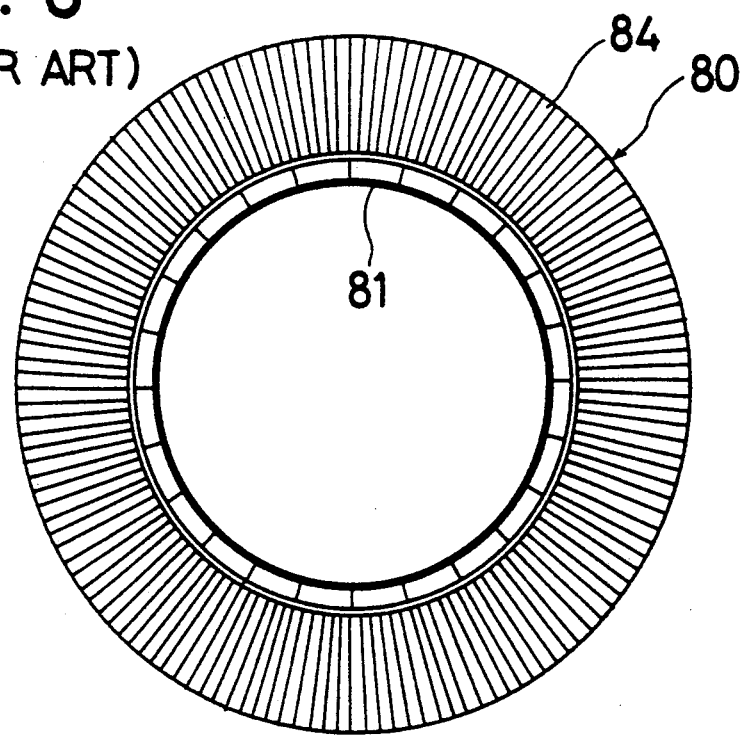
FIG. 8 is a cross-sectional view of FIG. 7 along section line 8—8.

Next, referring to FIG. 6, which shows a linear actuator 70 of a third embodiment according to the present invention, only the construction different from the second embodiment will be described thereinafter.

Third spacer 71 which is made of magnetic material is interposed between two adjacent stationary cores 56 at the inner circumference portion thereof. A width of the third spacer 71 is the same as the width W (shown in FIG. 5) of the magnetic pole 59. The thickness of the third spacer 71 is the same as the thickness of the second spacer 63. This magnetic third spacer 71 is called "magnetic wedge" in general. The third spacers 71 control the flow of the magnetic flux from the permanent magnets 55 to the stationary cores 56 and help smooth movement of the shaft 51.

Obviously, numerous modifications and variations of the present invention are possible in light of the above teachings. It is therefore to be understood that within the scope of the appended claims, the invention may be practiced otherwise than as specifically described herein.

What is claimed is:

1. A linear actuator comprising:
   a shaft made of non-magnetic material for being reciprocatingly moved in an axial direction of the shaft;
   a plurality of ring-shaped moving cores located on the shaft and arranged in the axial direction thereof, each of said moving cores being comprised of a plurality of laminated plates of magnetic material;
   a first spacer made of non-magnetic material and interposed between adjacent moving cores;
   a plurality of ring-shaped permanent magnets, each of said permanent magnets being mounted on one of the ring-shaped moving cores, each of said permanent magnets including a plurality of magnets arranged circumferentially so that adjacent magnets possess different polarities, the polarities of each of the permanent magnets being radially oriented with respect to the shaft;
   a stationary core located around at least one of the permanent magnets so that a clearance is provided between the stationary core and the permanent magnet, a number of stationary cores in the axial direction of the shaft being at least one less than a number of permanent magnets, each stationary core being comprised of a plurality of laminated plates of magnetic material, each of the plates forming the stationary core including an outer ring, magnetic poles which face the permanent magnets, and legs connecting the magnetic poles to the outer ring; and coils wound around the legs.

2. A linear actuator as set forth in claim 1, wherein each of the ring-shaped permanent magnets is formed as an aggregate of sector-shaped permanent magnet elements, the polarities of each of the sector-shaped permanent magnet elements being radially oriented and the polarities of correspondingly positioned sector-shaped permanent magnet elements in adjacent ring-shaped permanent magnets being different.

3. A linear actuator as set forth in claim 1, wherein a length of each permanent magnet in the axial direction of the shaft is same as a stroke of the shaft during reciprocating movement.

4. A linear actuator as set forth in claim 1, wherein the coils are wound through the stationary core in an axial direction of the stationary core.

5. A linear actuator as set forth in claim 1, including at least two stationary cores and a second spacer made of non-magnetic material interposed between adjacent stationary cores.

6. A linear actuator as set forth in claim 5, wherein, for each of the plates forming the stationary cores, a center line of each magnetic pole and a center line of the leg connecting the magnetic pole to the outer ring form an angle of 360/P degrees, where P is the number of the magnetic poles in each plate forming the stationary core.

7. A linear actuator as set forth in claim 6, including a plurality of stationary cores, the magnetic poles of each stationary core being angled relative to the center line of the respective legs in a direction opposite to the direction in which the magnetic poles of an adjacent stationary core are angled with respect to their respective legs.

8. A linear actuator as set forth in claim 6, including a third spacer made of magnetic material and interposed between adjacent stationary cores at an inner circumferential portion of the stationary cores.

9. A linear actuator as set forth in claim 6, wherein a width of the third spacer is the same as a width of the magnetic pole.

10. A linear actuator as set forth in claim 1, wherein each of the ring-shaped permanent magnets is formed as an aggregate of sector-shaped permanent magnet elements, each of the sector-shaped permanent magnet elements having radially oriented polarities, the polarities of adjacent sector-shaped permanent magnet elements within each of the ring-shaped permanent magnets being different.

11. A linear actuator as set forth in claim 6, wherein each of the magnetic poles of the stationary cores is radially aligned with a magnetic pole in each other stationary core.

12. A linear actuator as set forth in claim 1, wherein each of the ring-shaped permanent magnets is formed as an aggregate of sector-shaped permanent magnet elements, each of the sector-shaped permanent magnet elements having radially oriented polarities, the polarities of each sector-shaped permanent magnet element within a ring-shaped permanent magnet being different from a correspondingly positioned sector-shaped permanent magnet element in an adjacent ring-shaped permanent magnet.

13. A linear actuator comprising:

a shaft made of non-magnetic material for being reciprocatingly moved in an axial direction of the shaft;

at least three ring-shaped moving cores made of magnetic material and located on the shaft and arranged in the axial direction thereof;

a first spacer made of non-magnetic material and interposed between two adjacent moving cores;

a plurality of ring-shaped permanent magnets, each of the permanent magnets being mounted on one of the ring-shaped moving cores, each of the permanent magnets including a plurality of magnets arranged circumferentially so that adjacent magnets possess different polarities, adjacent magnets possessing different polarities in the axial direction of the shaft, the polarities of each of the permanent magnets being radially oriented with respect to the shaft;

at least two stationary cores made of magnetic material, each of the stationary cores being located around at least one of the permanent magnets so that a clearance is provided between the stationary cores and the permanent magnets, the number of stationary cores in the axial direction of the shaft being at least one less than a number of permanent magnets, each of the stationary cores including an outer ring, magnetic poles which face the permanent magnets, and legs connecting the magnetic poles to the outer ring, the legs and the magnetic poles having a center line, the legs of adjacent stationary cores being in a straight line, the magnetic poles of said each the stationary cores being angled relative to the center line of the respective legs in a direction opposite to the direction in which the magnetic poles of an adjacent stationary core are angled with respect to their respective legs;

a second spacer made of non-magnetic material and interposed between two adjacent stationary cores; and coils wound around the legs, wherein, for each of the stationary cores, the center line of each magnetic pole and the center line of a leg connecting the magnetic poles to the outer ring form an angle of 360/P degrees, where P is number of the magnetic poles in the stationary core.

14. A linear actuator as set forth in claim 13, including a plurality of first spacers, each pair of adjacent moving cores being separated by one of the first spacers.

15. A linear actuator as set forth in claim 13, including more than two stationary cores and a plurality of second spacers, each pair of adjacent stationary cores being separated by one of the second spacers.

16. A linear actuator as set forth in claim 13, wherein each of the ring-shaped permanent magnets is formed as an aggregate of sector-shaped permanent magnet elements, each of the sector-shaped permanent magnet elements having radially oriented polarities, the polarities of adjacent sector-shaped permanent magnet elements within each of the ring-shaped permanent magnets being different.

17. A linear actuator as set forth in claim 13, wherein each of the ring-shaped permanent magnets is formed as an aggregate of sector-shaped permanent magnet elements, each of the sector-shaped permanent magnet elements having radially oriented polarities, the polarities of each sector-shaped permanent magnet element within a ring-shaped permanent magnet being different from a correspondingly positioned sector-shaped permanent magnet element in an adjacent ring-shaped permanent magnet.

18. A linear actuator as set forth in claim 13, wherein the coils are wound through the stationary core in an axial direction of the stationary cores.

19. A linear actuator as set forth in claim 13, including a third spacer made of magnetic material and interposed between adjacent stationary cores at an inner circumferential portion of the stationary cores.

* * * * *

UNITED STATES PATENT AND TRADEMARK OFFICE
CERTIFICATE OF CORRECTION

PATENT NO. : 5,208,498

DATED : May 4, 1993

INVENTOR(S) : Takanori HAMAJIMA

It is certified that error appears in the above-identified patent and that said Letters Patent is hereby corrected as shown below: On the title page: Item

[73], delete "Aisien" and insert -- Aisin --.

Signed and Sealed this

Seventh Day of December, 1993

Attest:

BRUCE LEHMAN

*Attesting Officer*       *Commissioner of Patents and Trademarks*